(12) United States Patent
Takano et al.

(10) Patent No.: US 10,707,711 B2
(45) Date of Patent: Jul. 7, 2020

(54) ROTOR AND ROTATING ELECTRICAL MACHINE

(71) Applicant: FANUC CORPORATION, Yamanashi (JP)

(72) Inventors: Shinobu Takano, Yamanashi (JP); Hisashi Maeda, Yamanashi (JP); Takafumi Kajiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/100,237

(22) Filed: Aug. 10, 2018

(65) Prior Publication Data

US 2019/0068014 A1    Feb. 28, 2019

(30) Foreign Application Priority Data

Aug. 24, 2017    (JP) .................................. 2017-161239

(51) Int. Cl.
  *H02K 1/27*    (2006.01)
  *H02K 1/28*    (2006.01)
  (Continued)

(52) U.S. Cl.
  CPC ............... *H02K 1/278* (2013.01); *H02K 1/28* (2013.01); *H02K 15/03* (2013.01); *H02K 21/12* (2013.01);
  (Continued)

(58) Field of Classification Search
  CPC ............. H02K 1/28; H02K 1/30; H02K 1/278
  (Continued)

(56) References Cited

U.S. PATENT DOCUMENTS

| 4,837,472 A * | 6/1989 | Kotera | H02K 1/278 29/598 |
| 5,170,085 A * | 12/1992 | Shinto | H02K 1/278 310/156.28 |
| 2014/0300233 A1* | 10/2014 | Arimatsu | H02K 1/278 310/156.12 |

FOREIGN PATENT DOCUMENTS

| JP | H04109837 A | 4/1992 |
| JP | H10225032 A | 8/1998 |

(Continued)

OTHER PUBLICATIONS

Machine Translation, Shimozu, JP-2014090628-A, May 2014. (Year: 2014).*

(Continued)

*Primary Examiner* — Thomas Truong
(74) *Attorney, Agent, or Firm* — Studebaker & Brackett PC

(57) ABSTRACT

A rotor includes: a rotating member; a permanent magnet arranged in a plurality of rows along a circumferential direction of the rotating member and divided into a plurality of parts in a rotational axis direction X of the rotating member; and a cover tube divided into a plurality of parts in the rotational axis direction of the rotating member and covering an outer circumferential surface of the permanent magnet, the cover tube being formed of a fiber-reinforced plastic, wherein the plurality of permanent magnets in each row are arranged in an oblique direction with respect to the rotational axis direction of the rotating member, and the permanent magnets adjacent to the arrangement direction are disposed to be skewed in the circumferential direction, and at least one of the divided cover tubes covers an outer circumferential surface of one of the divided permanent magnets in the circumferential direction of the rotating member.

6 Claims, 10 Drawing Sheets

(51) Int. Cl.
*H02K 21/16* (2006.01)
*H02K 15/03* (2006.01)
*H02K 21/12* (2006.01)
*H02K 9/19* (2006.01)
*H02K 3/24* (2006.01)
*H02K 5/16* (2006.01)

(52) U.S. Cl.
CPC ............... *H02K 21/16* (2013.01); *H02K 3/24* (2013.01); *H02K 5/16* (2013.01); *H02K 9/19* (2013.01); *H02K 2201/06* (2013.01)

(58) Field of Classification Search
USPC ............. 310/156.01, 156.12, 156.28, 156.31
See application file for complete search history.

(56) References Cited

FOREIGN PATENT DOCUMENTS

| | | |
|---|---|---|
| JP | 11-089142 A | 3/1999 |
| JP | 2001169487 A * | 6/2001 |
| JP | 2014090628 A * | 5/2014 |
| JP | 2014209847 A | 11/2014 |
| JP | 2017050925 A | 3/2017 |
| JP | 6168263 B1 | 7/2017 |
| WO | 2015/118682 A1 | 8/2015 |

OTHER PUBLICATIONS

Machine Translation, Nakano, JP-2001169487-A, Jun. 2001. (Year: 2001).*

An Office Action mailed by the Japanese Patent Office dated Jul. 9, 2019, which corresponds to Japanese Patent Application No. 2017-161239 and is related to U.S. Appl. No. 16/100,237.

A Notification of Reasons for Refusal mailed by the Japanese Patent Office dated Nov. 26, 2019, which corresponds to Japanese Patent Application No. 2017-161239.

* cited by examiner

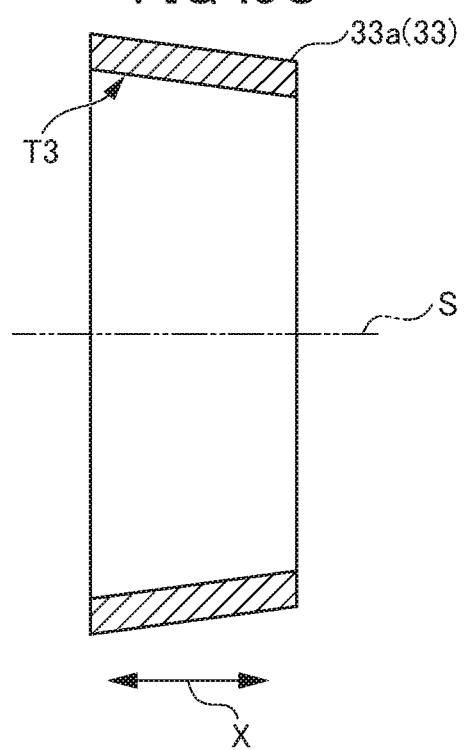

ROTOR AND ROTATING ELECTRICAL MACHINE

This application is based on and claims the benefit of priority from Japanese Patent Application No. 2017-161239, filed on 24 Aug. 2017, the content of which is incorporated herein by reference.

BACKGROUND OF THE INVENTION

Field of the Invention

The present invention relates to a rotor and a rotating electrical machine having the same.

Related Art

A SPM (Surface Permanent Magnet)-type motor in which permanent magnets are disposed on the outer circumference of a rotating member (a sleeve, a rotating shaft, and the like) is known as one type of motors which use permanent magnets. In this SPM-type motor, in order to prevent the permanent magnets from being detached from the rotor due to centrifugal force at high-speed rotation, a cylindrical cover tube (a protection tube) is attached to the outer circumference of the rotor. As a material of the cover tube, a fiber-reinforced plastic (FRP) (particularly, a carbon fiber-reinforced plastic (hereinafter, "CFRP")) is widely used due to its high strength, light weight, and the like (for example, see Patent Document 1).

Patent Document 1: Japanese Unexamined Patent Application, Publication No. H11-89142

SUMMARY OF THE INVENTION

In the above-described rotor, the permanent magnet is disposed by being divided in the rotating axis direction of the rotating member in order to reduce an eddy current loss resulting from the effect of a magnetic field. Moreover, in order to reduce a cogging torque and a torque ripple which is the cause of noise and vibration, the divided permanent magnets are arranged in an oblique direction with respect to the rotating axis direction of the rotating member, and permanent magnets adjacent in the arrangement direction are arranged to be skewed in a circumferential direction (this arrangement is also referred to as a "skew arrangement").

When a plurality of divided permanent magnets are arranged in a skewed manner, corner portions of the permanent magnets protrude in a step form along the arrangement direction. When a cover tube is attached to the outer circumferential surface of the permanent magnet, an inner circumferential surface of the cover tube is scraped by the protruding corner portion of the permanent magnet, and the strength of the cover tube may decrease. Due to this, in a configuration in which a plurality of divided permanent magnets are arranged in a skewed manner, it is necessary to suppress a decrease in strength of the cover tube. An object of the present invention is to provide a rotor and a rotating electrical machine capable of suppressing a decrease in strength of a cover tube in a configuration in which a plurality of divided permanent magnets are arranged in a skewed manner.

(1) The present invention provides a rotor (for example, a rotor 30 to be described later) including: a rotating member (for example, a sleeve 31 to be described later); a permanent magnet (for example, a permanent magnet 32 to be described later) arranged in a plurality of rows along a circumferential direction of the rotating member and divided into a plurality of parts in a rotational axis direction (for example, a rotational axis direction X to be described later) of the rotating member; and a cover tube (for example, a cover tube 33 to be described later) divided into a plurality of parts in the rotational axis direction of the rotating member and covering an outer circumferential surface of the permanent magnet, the cover tube being formed of a fiber-reinforced plastic, wherein the plurality of permanent magnets in each row are arranged in an oblique direction with respect to the rotational axis direction of the rotating member, and the permanent magnets adjacent to the arrangement direction are disposed to be skewed in the circumferential direction, and at least one of the divided cover tubes covers an outer circumferential surface of one of the divided permanent magnets in the circumferential direction of the rotating member.

(2) In the rotor according to (1), the divided cover tube may have a tapered portion (for example, a tapered portion T1 to be described later) at an end of an inner circumferential surface on a side serving as an advancing direction when attaching the cover tube to the outer circumference side of the permanent magnet.

(3) In the rotor according to (1), the divided cover tube may have a tapered portion (for example, a tapered portion T2 to be described later) between an end of an inner circumferential surface on a side serving as an advancing direction when attaching the cover tube to the outer circumference side of the permanent magnet and an end on the opposite side.

(4) In the rotor according to any one of (1) to (3), at least one end in the rotational axis direction of the cover tube may protrude outward further than one end in the rotational axis direction of the permanent magnet.

(5) In the rotor according to any one of (1) to (4), the permanent magnet has a tapered portion (for example, a tapered portion T4, T5 to be described later) on a side serving as an advancing direction when attaching the cover tube to the outer circumference side of the permanent magnet.

(6) The present invention also provides a rotating electrical machine (for example, a motor 1 to be described later) including: the rotor according to any one of (1) to (5); and a stator (for example, a stator 20 to be described later) provided on the outer circumference side of the rotor.

According to the present invention, it is possible to provide a rotor and a rotating electrical machine capable of suppressing a decrease in strength of a cover tube in a configuration in which a plurality of divided permanent magnets are arranged in a skewed manner.

BRIEF DESCRIPTION OF THE DRAWINGS

FIG. 5C is a cross-sectional view illustrating a third configuration of the cover tube portion 33a according to the second embodiment.

DETAILED DESCRIPTION OF THE INVENTION

Figure 1:
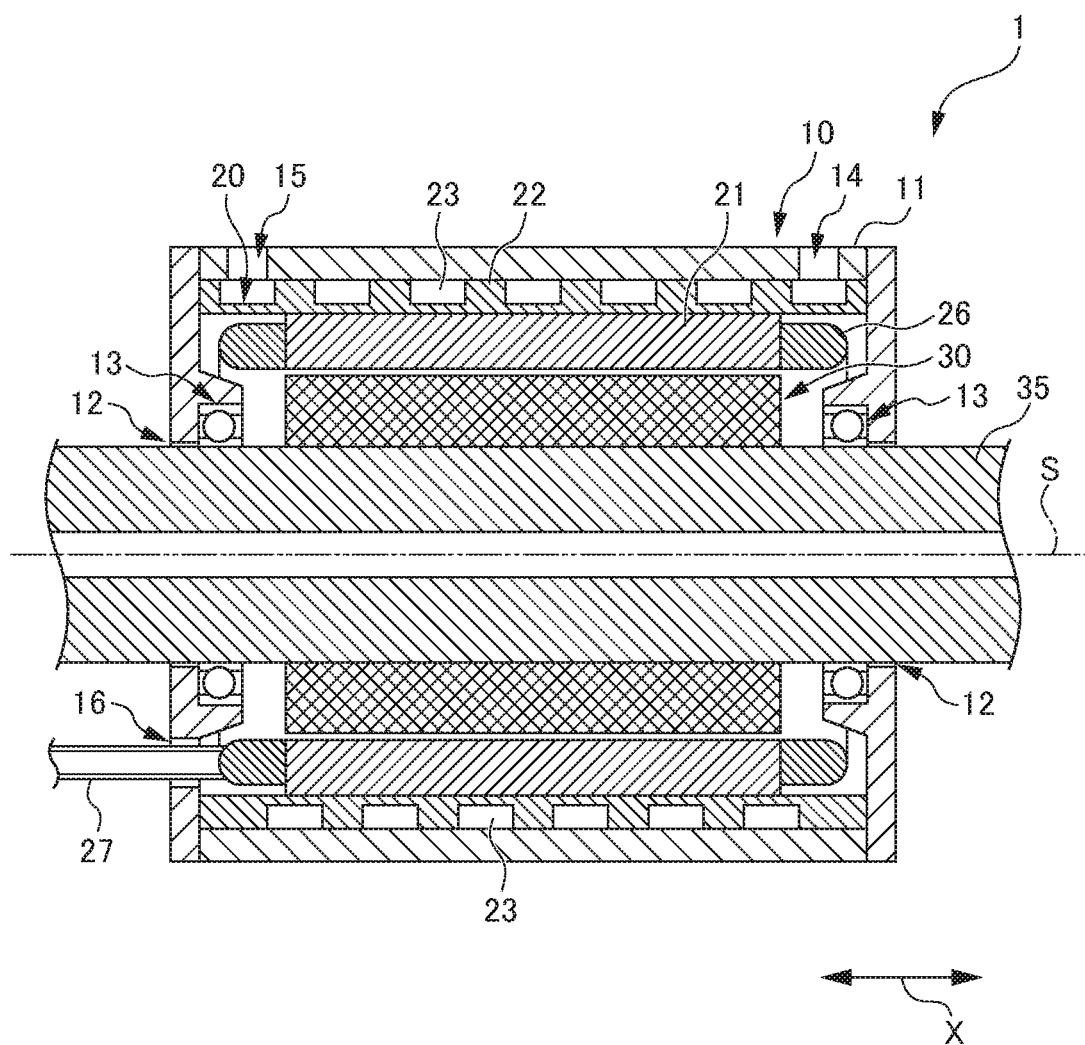
FIG. 1 is a cross-sectional view illustrating a configuration of a motor 1 according to a first embodiment.

Hereinafter, embodiments of the present invention will be described. The drawings attached to the present specification are schematic diagrams, for better understanding, the shapes, the scales, the vertical to horizontal dimensional ratio, and the like are changed or exaggerated from the actual ones. In the drawings, hatching indicating a cross-section of a member is omitted appropriately. In the present specification and the like, terms that specify shapes, geometric conditions, and the extents thereof (for example, terms "parallel", "direction", and the like) include a range of extents where it can be regarded as being substantially parallel and a range where it can be regarded as substantially the direction in addition to the strict meaning of the term.

In the present specification and the like, a line serving as the center of rotation of a rotating shaft 35 to be described later is referred to as a "rotational axial line S", and a direction along the rotational axial line S is also referred to as a "rotational axis direction". The "rotational axial line S" and the "rotational axis direction" are applied to respective portions that form a rotor (for example, a sleeve, a permanent magnet, a cover tube, and the like to be described later). In the present specification and the like, a direction parallel to the rotational axial line S is referred to as an X direction and the rotational axis direction is referred to appropriately as a "rotational axis direction X".

First Embodiment

First, a motor 1 as a rotating electrical machine, including a rotor 30 of the first embodiment will be described. A configuration of the motor 1 to be described in the present embodiment is common to other embodiments to be described later. FIG. 1 is a cross-sectional view illustrating a configuration of the motor 1 according to the first embodiment. The configuration of the motor 1 illustrated in FIG. 1 is an example, and an arbitrary configuration may be used if the rotor 30 of the first embodiment can be applied.

As illustrated in FIG. 1, the motor 1 includes a frame 10, a stator 20, a rotor 30, and a rotating shaft 35 as its main constituent elements. The frame 10 is an exterior member of the motor 1 and includes a frame body 11 and a shaft hole 12.

The frame body 11 is a housing that surrounds and holds the stator 20. The frame body 11 holds the rotor 30 with a bearing 13 disposed therebetween. The frame body 11 has a supply port 14, a discharge port 15, and a hole 16. The supply port 14 is an opening for supplying a coolant to a passage 23 of the stator frame 22 and is connected to a coolant supply pipe (not illustrated). The discharge port 15 is an opening for discharging the coolant having passed through the passage 23 and is connected to a coolant discharge pipe (not illustrated). The hole 16 is an opening for passing a power line 27 (to be described later) drawn from the stator 20. The shaft hole 12 is a hole through which the rotating shaft 35 (to be described later) passes.

The stator 20 is a composite member that forms a rotating magnetic field for rotating the rotor 30. The stator 20 is formed generally in a cylindrical form and is fixed to the inside of the frame 10. The stator 20 has an iron core 21 and a stator frame 22.

The iron core 21 is a member in which a winding 26 can be disposed on an inner side thereof. The iron core 21 is formed in a cylindrical form and is disposed inside the fixed stator frame 22. The iron core 21 has a plurality of grooves (not illustrated) formed in an inner surface thereof and the winding 26 is disposed in the grooves. A portion of the winding 26 protrudes from both ends of the iron core 21 in an axial direction of the iron core 21. The iron core 21 is manufactured by superimposing a plurality of thin plates such as an electromagnetic steel sheet to form a laminate and integrating the laminates by bonding, caulking, or the like.

The stator frame 22 is a member that holds the iron core 21 on an inner side thereof. The stator frame 22 is formed in a cylindrical form and is disposed outside the stator 20. The iron core 21 is strongly bonded to the stator frame 22 in order to block a repulsive force generated by the torque of the rotor 30. As illustrated in FIG. 1, the stator frame 22 of the present embodiment has a passage 23 for cooling the heat transmitted to the iron core 21. The passage 23 is one or a plurality of sets of spiral grooves formed in an outer surface of the stator frame 22. The coolant (not illustrated) supplied from the supply port 14 of the frame body 11 (the frame 10) passes through the passage 23 so as to follow the outer surface of the stator frame 22 in the spiral form and is discharged outside from the discharge port 15 of the frame body 11.

The power line 27 electrically connected to the winding 26 is drawn from the iron core 21 of the stator 20. The power line 27 is connected to a power supply device (not illustrated) provided outside the motor 1. During operation of the motor 1, for example, a three-phase AC current is supplied to the iron core 21 whereby a rotating magnetic field for rotating the rotor 30.

The rotor 30 is a part that rotates with a magnetic interaction with the rotating magnetic field formed by the stator 20. The rotor 30 is provided on the inner circumference side of the stator 20. A configuration of the rotor 30 will be described later.

The rotating shaft 35 is a member that supports the rotor 30. The rotating shaft 35 is inserted so as to pass through the shaft center of the rotor 30 and is fixed to the rotor 30. A pair of bearings 13 is attached to the rotating shaft 35. The bearing 13 is a member that rotatably supports the rotating shaft 35 and is provided in the frame 10. The rotating shaft 35 is supported to be rotatable about the rotational axial line S by the frame 11 and the bearing 13. The rotating shaft 35 passes through the shaft hole 12 and is connected to a cutting tool, a power transmission mechanism provided outside, and a reduction gear (which are not illustrated), for example.

In the motor 1 illustrated in FIG. 1, when a three-phase AC current is supplied to the stator 20 (the iron core 21), a rotating force is generated in the rotor 30 by the magnetic interaction between the rotor 30 and the stator 20 in which the rotating magnetic field is formed and the rotating force is output to the outside via the rotating shaft 35.

Figure 2:
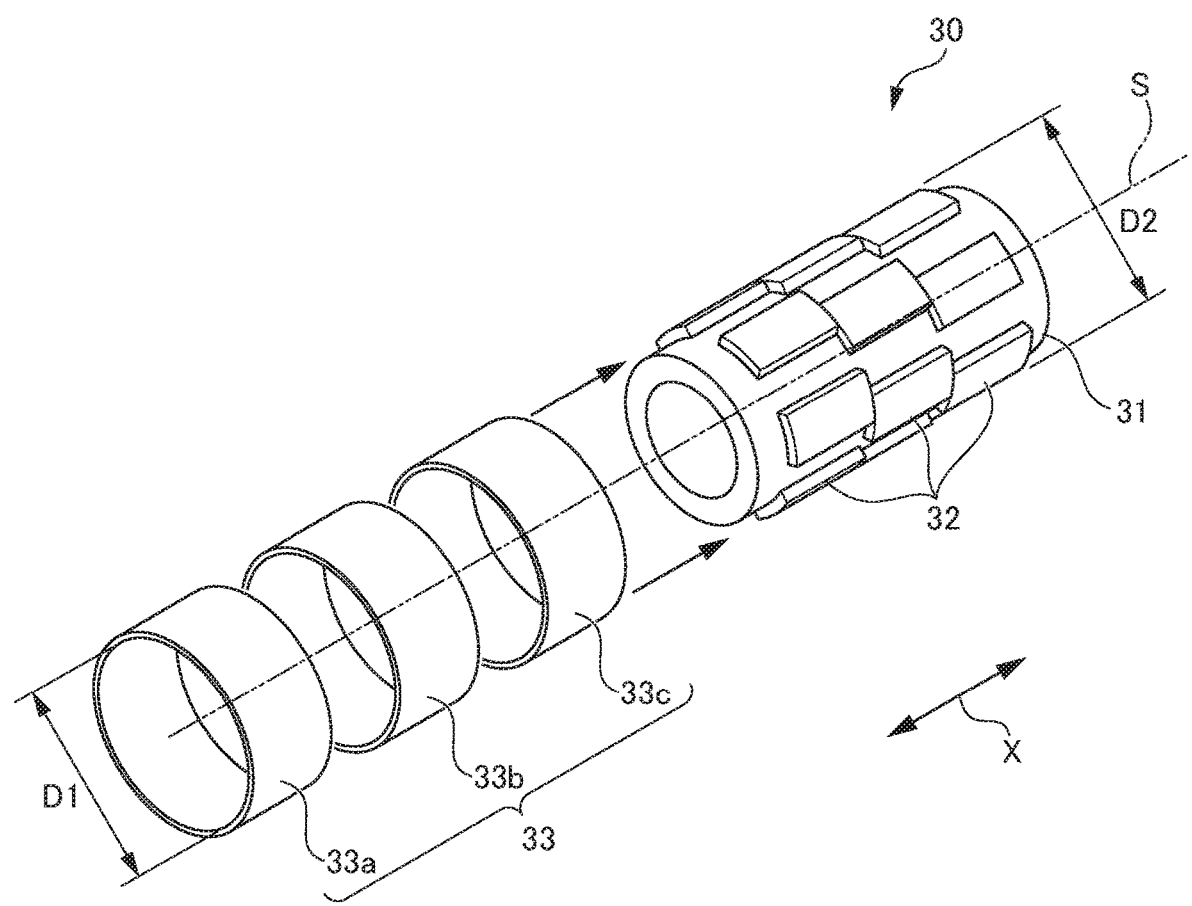
FIG. 2 is an exploded perspective view of a rotor 30.
Figure 3:
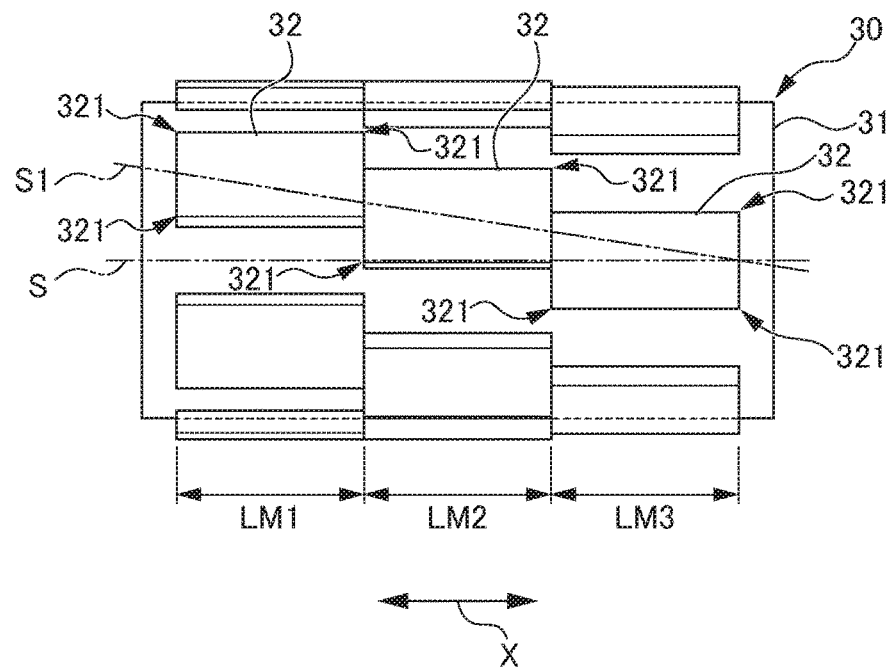
FIG. 3 a side view of the rotor 30 in which permanent magnets 32 are arranged.
Figure 4:
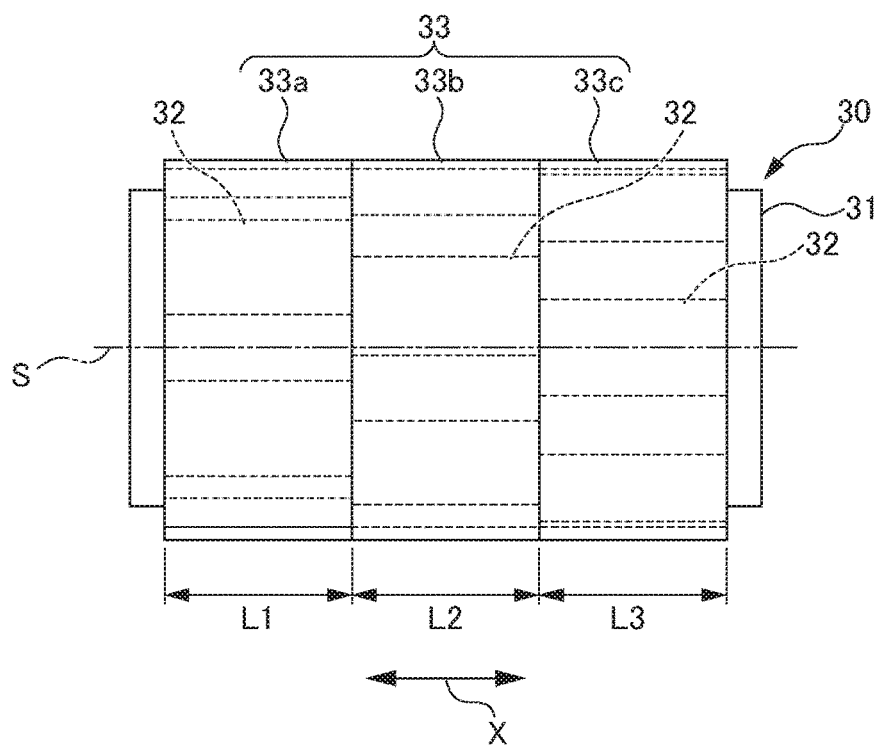
FIG. 4 is a side view illustrating the rotor 30 to which a cover tube 33 is attached.

Next, a configuration of the rotor 30 will be described. FIG. 2 is an exploded perspective view of the rotor 30. FIG. 3 is a side view illustrating the rotor 30 in which the permanent magnet 32 is disposed. FIG. 4 is a side view illustrating the rotor 30 to which the cover tube 33 is attached. FIGS. 3 and 4 illustrate a state before the rotor 30 is fitted to the rotating shaft 35 (see FIG. 1).

As illustrated in FIG. 2, the rotor 30 includes a sleeve (a rotating member) 31, the permanent magnet 32, and the cover tube 33. The sleeve 31 is an approximately cylindrical member to which a plurality of permanent magnets 32 is attached and is provided on the outer circumference side of the rotating shaft 35. The sleeve 31 is formed of a magnetic material such as carbon steel, for example. The rotor 30 having the sleeve 31 on the inner circumference side is fitted by fastening to the outer circumference of the rotating shaft 35.

The permanent magnet 32 a member that generates a magnetic field, and as illustrated in FIG. 2, 6 rows of permanent magnets are provided along the circumferential direction on the outer circumference side of the sleeve 31 (four rows on the front side are illustrated in FIG. 2). In the rotor 30, a row of N-polarity permanent magnets 32 and a row of S-clarity permanent magnets 32 are arranged alternately in the circumferential direction of the sleeve 31. The permanent magnet 32 bonded to the outer circumferential surface of the sleeve 31 by an adhesion layer (not illustrated).

As illustrated in FIG. 3, the permanent magnet 32 on each row is divided into three parts along the rotational axis direction X of the sleeve 31. The lengths LM1, LM2, and LM3 in the rotational axis direction X of the three divided permanent magnets 32 are equal (LM1=LM2=LM3) but may be different from each other. In the following description, the length in the rotational axis direction X of one permanent magnet 32 is referred to "LM".

Moreover, the permanent magnet 32 on each row is arranged in an oblique direction (hereinafter also referred to as an "arrangement direction S1") with respect to the rotational axis direction X of the sleeve 31. In each row, the permanent magnets 32 adjacent in the arrangement direction S1 are skewed in the circumferential direction. That is, the permanent magnets 32 are arranged along the arrangement direction S1 in the rotational axis direction X of the sleeve 31 and are skewed in parallel along the direction orthogonal to the rotational axis direction X in the circumferential direction. In this manner, when the permanent magnets 32 are disposed in a skewed manner, corner portions 321 on each row protrude in a step form along the arrangement direction S1 as illustrated in FIG. 3.

The cover tube 33 is a cylindrical member for covering the plurality of permanent magnets 32. As illustrated in FIG. 4, the cover tube 33 is attached to the outer circumferential surface of the permanent magnet 32 disposed in the sleeve 31. The cover tube 33 of the present embodiment is divided into three parts along the rotational axis direction X of the rotor 30. When the cover tube 33 is attached to the outer circumferential surface of the permanent magnet 32, it is possible to suppress the permanent magnet 32 from being detached from the rotor 30 by the centrifugal force generated by rotation of the rotor 30. In the present embodiment, although the cover tube 33 is attached directly to the outer circumferential surface of the permanent magnet 32, the cover tube 33 may be attached to the outer circumferential surface of the permanent magnet 32 with an adhesion layer or the like, for example, disposed therebetween.

The cover tube 33 can be formed by wrapping a CFRP fiber sheet around a cylindrical jig (not illustrated) together with a resin. As a material for forming the cover tube 33, a fiber-reinforced plastic containing a material having a high specific strength such as, for example, a glass fiber, an aramid fiber, a silicon carbide fiber, a boron fiber, or a titanium alloy fiber can be used in addition to the CFRP. By cutting the cover tube 33 formed in the above-described manner to a predetermined length in the rotational axis direction X, it is possible to obtain a plurality of cover tube portions to be described later.

The cover tube 33 is inserted into the rotor 30 in a state of being pressed by a dedicated jig (not illustrated) and is attached to the rotor 30 by a contraction force corresponding to a tightening margin. In this way, a repulsive force (hereinafter also referred to as a "contraction force") sufficient for holding the permanent magnet 32 while resisting against the centrifugal force generated when the rotor 30 rotates is applied to the cover tube 33 in a direction toward the inner side of a radial direction. In this manner, a contraction force is applied to the cover tube 33 in a direction toward the inner side of the radial direction, whereby the permanent magnet 32 is suppressed from being detached from the rotor 30 by the centrifugal force. The inner side of the radial direction is a direction from the outer side of the rotor 30 toward the rotational axial line S.

As illustrated in FIG. 2, the tightening margin is a dimension corresponding to an excess (D2-D1) of an outer diameter D2 of the permanent magnet 32 disposed in the sleeve 31 with respect to an inner diameter D1 of the cover tube 33 before attachment. The larger the tightening margin, the harder the cover tube 33 is attached to the outer circumferential surface of the permanent magnet 32, and the larger the contraction force be applied to the inner side of the radial direction from the attached cover tube 33.

As illustrated in FIG. 4, the cover tube 33 of the first embodiment is divided into three parts along the rotational axis direction X of the rotor 30. In this example, the three divided cover tubes 33 will be referred to as cover tube portions 33a, 33b, and 33c. In the following description, the cover tube portions 33a to 33c are also referred to simply as "cover tube portion" by omitting the reference numerals 33a to 33c.

As illustrated in FIG. 4, in the present embodiment, the lengths L1, L2, and L3 in the rotational axis direction X of the respective cover tube portions are equal (L1=L2=L3). Moreover, the lengths L1 to L3 of the respective cover tube portions are set to be equal to the lengths LM1, LM2, and LM3 (see FIG. 3) in the rotational axis direction X of the divided permanent magnets 32. Due to this, in the present embodiment, one cover tube portion covers the plurality of permanent magnets 32 positioned at the same position in the rotational axis direction X and arranged in the circumferential direction.

By attaching the cover tube portions to the rotor 30 in the order of the cover tube portions 33b, 33a, and 33c, an overall distance of the cover tube portion 33 moving on the outer circumferential surface of the permanent magnet 32 can be shortened. For example, when the cover tube portion 33b is inserted from the right side of the rotational axis direction X, the inner circumferential surface of the cover tube portion 33b is scraped to a length of LM×2 by the corner portions 321 of the two permanent magnets 32 until the cover tube portion 33b reaches the central position of the rotor 30. Moreover, when the cover tube portion 33a is inserted from the left side of the rotational axis direction X, the inner circumferential surface of the cover tube portion 33a is scraped to a length of LM by the corner portion 321 of one permanent magnet 32 until the cover tube portion 33a reaches the left end position of the rotor 30. Furthermore, when the cover tube portion 33b is inserted from the right side of the rotational axis direction X, the inner circumferential surface of the cover tube portion 33a is scraped to a length of LM by the corner portion 321 of one permanent magnet 32 until the cover tube portion 33b reaches the right end position of the rotor 30. Due to this, the length of the inner circumferential surface of the cover tube 33 scraped by the corner portions 321 of the permanent magnets 32 is LM×4 total.

On the other hand, when a long cover tube having a length of LM1+LM2+LM3 is inserted from the right side of the rotational axis direction X, the inner circumferential surface of the cover tube in a range corresponding to the cover tube portion 33a is scraped to a length of LM×3 by the corner portions 321 of the three permanent magnets 32 until the cover tube reaches the left end position of the rotor 30. Moreover, the inner circumferential surface of the cover tube in a range corresponding to the cover tube portion 33b is scraped to a length of LM×2 by the corner portions 321 of the two permanent magnets 32 until the cover tube reaches the central portion of the rotor 30. Furthermore, the inner circumferential surface of the cover tube in a range corresponding to the cover tube portion 33b is scraped to a length of LM by the corner portion 321 of one permanent magnet 32 until the cover tube reaches the right end position of the rotor 30. Due to this, the length of the inner circumferential surface of the long cover tube scraped by the corner portions 321 of the permanent magnets 32 is LM×6 in total.

Therefore, in the divided cover tubes 33 (the cover tube portions 33a, 33b, and 33c) of the present embodiment, the length of the inner circumferential surface scraped by the corner portions 321 of the permanent magnets 32 during insertion can be reduced by ⅔ as compared to the long cover tube having the length of LM1+LM2+LM3.

As described above, according to the rotor 30 of the first embodiment, since the cover tube 33 is divided into a plurality of cover tube portions, when the cover tube portions are attached to the outer circumferential surface of the plurality of permanent magnets 32 arranged in a skewed manner, the length of the inner circumferential surface of the cover tube portion scraped by the corner portions 321 of the permanent magnets 32 can be reduced in the entire cover tube 33. Due to this, in the rotor 30 of the first embodiment, a decrease in the strength of the cover tube 33 can be suppressed. Moreover, in the divided cover tube portion, since the frictional force generated between the inner circumferential surface and the outer circumferential surface of the rotor 30 is smaller than that when the long cover tube is inserted into the rotor 30, it is possible to insert the cover tube portion into the rotor 30 with a smaller force.

Second Embodiment

Figure 5A:
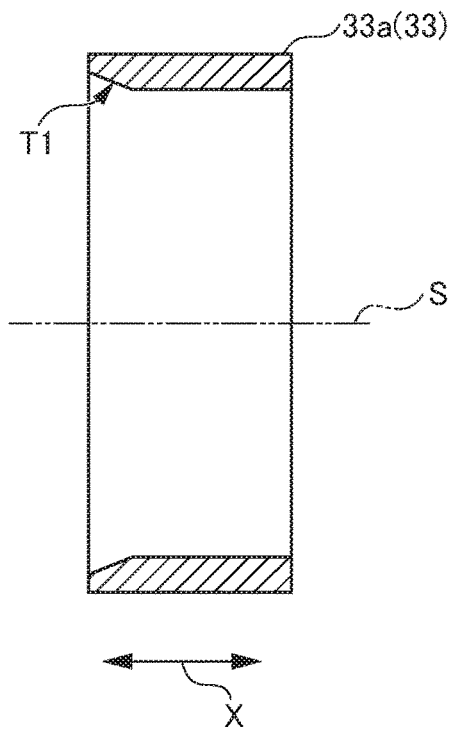
FIG. 5A is a cross-sectional view illustrating a first configuration of a cover tube portion 33a according to a second embodiment.
Figure 5B:
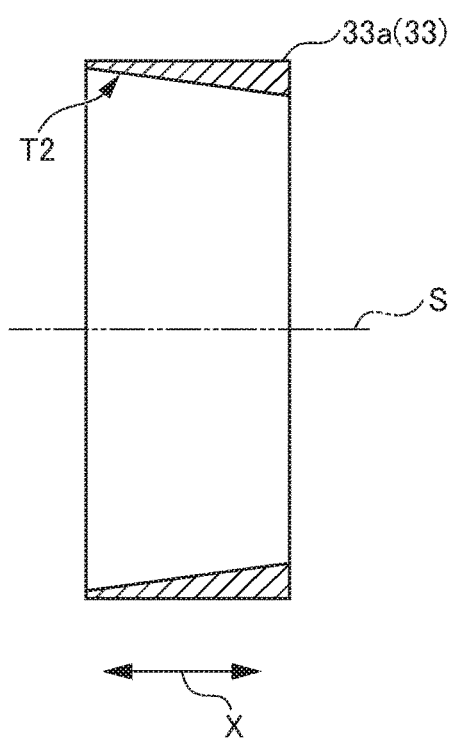
FIG. 5B is a cross-sectional view illustrating a second configuration of the cover tube portion 33a according to the second embodiment.

Next, a configuration of the cover tube 33 of the second embodiment will be described. FIG. 5A is a cross-sectional view illustrating a first configuration of the cover tube portion 33a of the second embodiment. FIG. 5A and FIGS. 5B and 5C to be described later illustrate the cross-section along the rotational axial line S of the cover tube portion 33a. In the second embodiment, although the cover tube portion 33a is described as a configuration of the cover tube portion by way of an example, the configuration of the present embodiment can be also applied to the cover tube portions 33b and 33c.

As illustrated in FIG. 5A, the cover tube portion 33a of the first configuration has a tapered portion T1 at an end of the inner circumferential surface on one side in the X direction. The tapered portion T1 is provided along the circumferential direction of the cover tube portion 33a at the end of the inner circumferential surface on one side in the X direction. In the cover tube portion 33a of the first configuration, the side where the tapered portion T1 is formed is an advancing (insertion) direction when the cover tube portion 33a is attached to the rotor 30 (see FIG. 4).

According to the cover tube portion 33a of the first configuration, when the cover tube portion 33a is inserted into the rotor 30, since the tapered portion T1 makes contact with the corner portion 321 of the permanent magnet 32 in an oblique direction, it is possible to suppress the inner circumferential surface of the cover tube portion 33a from being scraped by the corner portion 321 of the permanent magnet 32. Moreover, when the cover tube portion 33a is inserted into the rotor 30, since the diameter of the end of the cover tube portion 33a close to the X1 side increases gradually by the tapered portion T1, the resistance when inserting the cover tube portion 33a into the rotor 30 can be decreased.

FIG. 5B is a cross-sectional view illustrating a second configuration of the cover tube portion 33a according to the second embodiment. As illustrated in FIG. 5B, the cover tube portion 33a of the second configuration has a tapered portion T2 extending from an end of the inner circumferential surface on one side of the X direction to the end of the inner circumferential surface on the other side. The tapered portion T2 is provided along the circumferential direction between the end of the inner circumferential surface on one side of the X direction and the end of the inner circumferential surface on the other side. In the cover tube portion 53a of the second configuration, a side where the inner diameter of the tapered portion T2 is the largest is the advancing (insertion) direction when attaching the cover tube portion 33a to the rotor 30 (see FIG. 4).

According to the cover tube portion 33a of the second configuration, when the cover tube portion 33a is inserted into the rotor 30, since the tapered portion T2 makes contact with the corner portion 321 of the permanent magnet 32 in an oblique direction, it is possible to suppress the inner circumferential surface of the cover tube portion 33a from being scraped by the corner portion 321 of the permanent magnet 32. In the cover tube portion 33a of the second configuration, since the gradient of the tapered portion T2 is more gradual than that of the first tapered portion T1 of the first configuration, it is possible to further decrease the resistance when inserting the cover tube portion 33a into the rotor 30.

FIG. 5C is a cross-sectional view illustrating a third configuration of the cover tube portion 33a according to the second embodiment. As illustrated in FIG. 5C, the cover tube portion 33a of the third configuration is configured such that the intensity distribution and the outer diameter thereof increase gradually from one end in the X direction toward the other end. In the cover tube portion 33a of the third configuration, the tapered portion T3 is formed between one end in the X direction and the other end. The tapered portion T3 is provided along the circumferential direction between the end of the inner circumferential surface on one side of the X direction and the end of the inner circumferential surface on the other side. In the cover tube portion 33a, the tapered portion T3 is formed such that the thickness is equal in a region from one end in the X direction to the other end. In the cover tube portion 33a of the third configuration, a side where the inner diameter of the tapered portion T3 is the largest is the advancing (insertion) direction when attaching the cover tube portion 33a to the rotor 30 (see FIG. 2).

In the cover tube portion 33a of the third configuration, the same advantages as those of the cover tube portion 33a of the second configuration are obtained. In the cover tube portion 33a of the third configuration, since the thickness of the cover tube portion 33a serving as the tapered portion T3 is equal from one end in the X direction to the other end, it is possible to hold the permanent magnet 32 with more uniform contraction force along the rotational axis direction X of the rotor 30.

Third Embodiment

Figure 6:
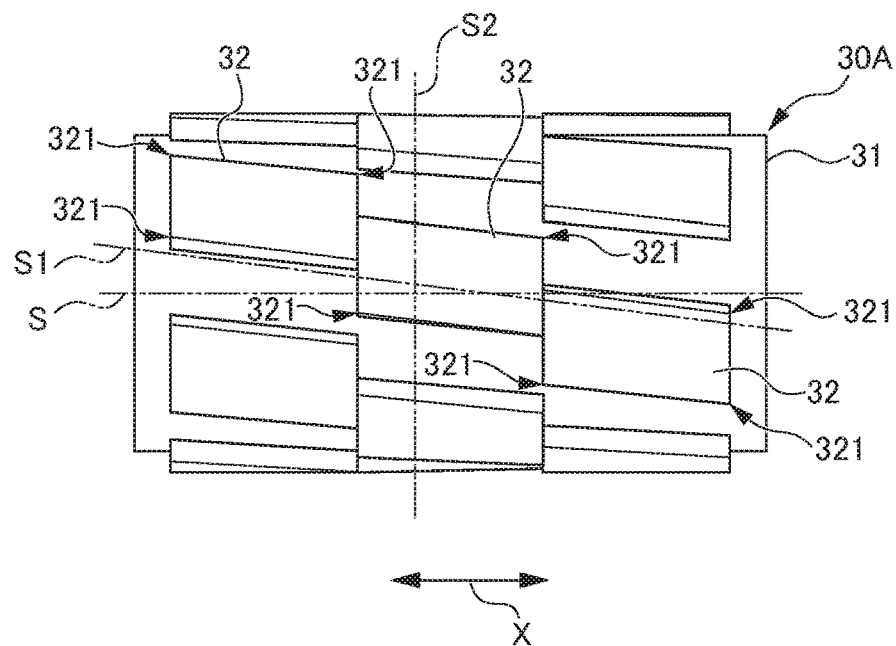
FIG. 6 a side view illustrating a rotor 30A in which permanent magnets 32 according to a third embodiment are arranged.
Figure 7:
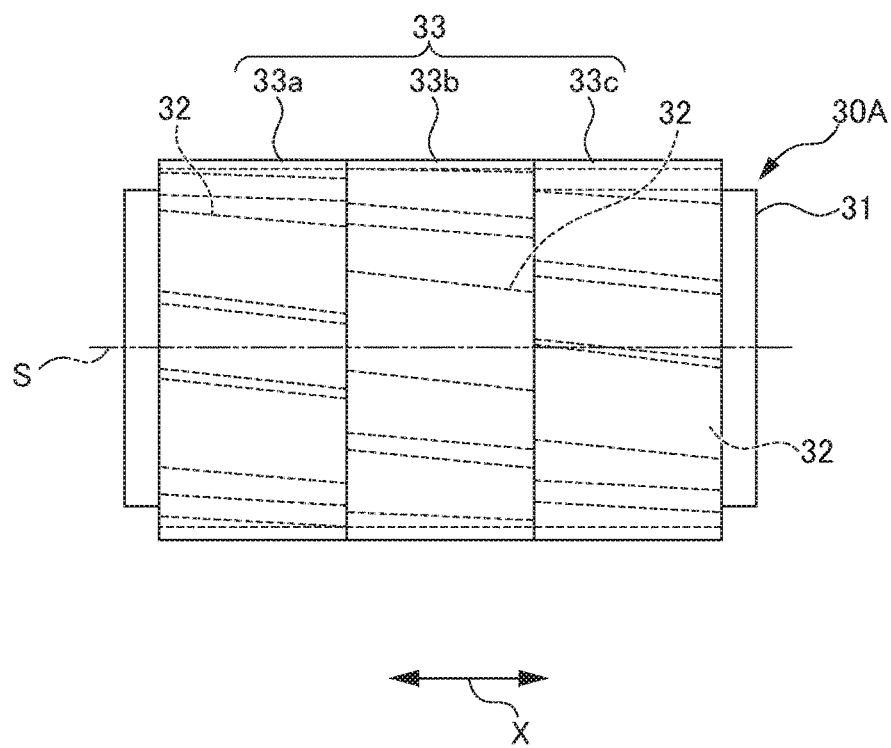
FIG. 7 is a side view illustrating the rotor 30A to which a cover tube 33 is attached.

Next, a configuration of a rotor 30A according to the third embodiment will be described. FIG. 6 is a side view illustrating a rotor 30A in which a permanent magnet 32 of the third embodiment is disposed. FIG. 7 is a side view illustrating the rotor 30A to which a cover tube 33 is attached. FIGS. 6 and 7 illustrate a state before the rotor 30A is fitted to the rotating shaft 35 (see FIG. 1). In the following description and drawings, portions that perform the same functions as those of the first embodiment will be denoted by the same reference numerals, and redundant description will be omitted appropriately.

In the rotor 30A of the third embodiment, as illustrated in FIG. 6, the permanent magnet 32 on each row is divided into three parts along the rotational axis direction X of the sleeve 31. The permanent magnet 32 on each row is arranged along the arrangement direction S1 with respect to the rotational axis direction X of the sleeve 31. In each row, the permanent magnets 32 adjacent to the arrangement direction S1 are disposed to be skewed in parallel to the direction S2 approximately orthogonal to the rotational axis direction X. That is, the permanent magnets 32 are arranged along the arrangement direction S1 in the rotational axis direction X of the sleeve 31 and are arranged to be skewed in parallel along the direction S2 approximately orthogonal to the rotational axis direction X in the circumferential direction. As described above, in the configuration of the present embodiment, the corner portions 321 of the permanent magnets 32 on each row arranged in a skewed manner protrude in a step form along the arrangement direction S1 as illustrated in. FIG. 6.

In the rotor 30A of the third embodiment, as illustrated in FIG. 7, the cover tube 33 is divided into three parts along the rotational axis direction X similarly to the first embodiment. Since the configuration of the cover tube portions 33a to 33c serving as the cover tube 33 is the same as that of the first embodiment, the description thereof will be omitted.

In the rotor 30A of the third embodiment, the corner portions 321 of the permanent magnets 32 on each row arranged in a skewed manner protrude in a step form along the arrangement direction S1. However, in the present embodiment, since the cover tube 33 is divided into a plurality of parts, the length of the inner circumferential surface of the cover tube portion scraped by the corner portions 321 of the permanent magnets 32 can be reduced.

Due to this, in the rotor 30A of the third embodiment, a decrease in the strength of the cover tube 33 due to the corner portion 321 of the permanent magnet 32 can be suppressed. Moreover, in the divided cover tube portion, since the frictional force generated between the inner circumferential surface and the outer circumferential surface of the rotor 30A is smaller than that when the long cover tube is inserted into the rotor 30A, it is possible to insert the cover tube portion into the rotor 30A with a smaller force.

As the configuration of the cover tube portions 33a to 33c, the configuration (see FIGS. 5A, 5B, and 5C) of the second embodiment can be applied to the rotor 30A of the third embodiment. In the rotor 30A of the third embodiment, although a short side of the permanent magnet 32 adjacent to the arrangement direction S1 is parallel to the direction approximately orthogonal to the rotational axis direction X, the present invention is not limited thereto. A short side of the permanent magnet 32 adjacent to the arrangement direction S1 may be configured to be parallel to the direction approximately orthogonal to the arrangement direction S1.

Fourth Embodiment

Figure 8:
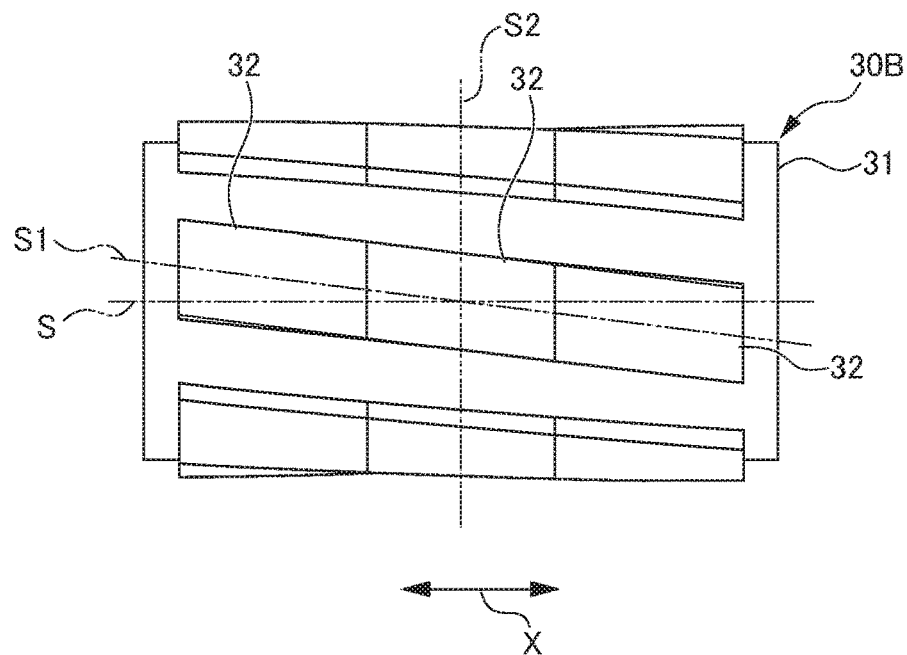
FIG. 8 is a side view illustrating a rotor 30B in which permanent magnets 32 according to a fourth embodiment are arranged.
Figure 9:
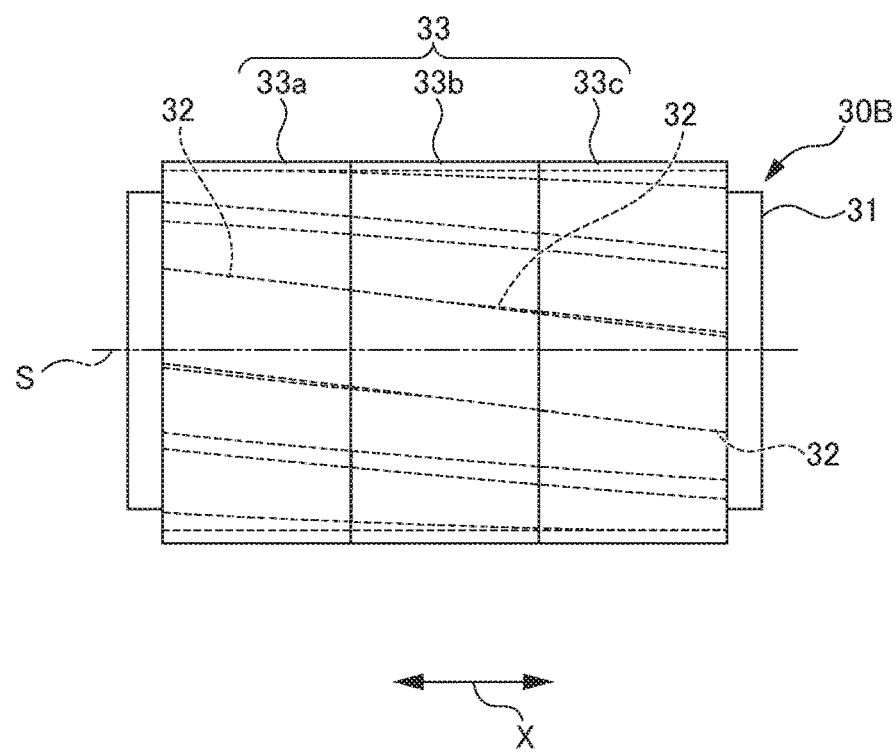
FIG. 9 is a side view illustrating the rotor 30B to which the cover tube 33 is attached.

Next, a configuration of a rotor 33B according to the fourth embodiment will be described. FIG. 8 is a side view illustrating the rotor 30B in which the permanent magnet 32 of the fourth embodiment is disposed. FIG. 9 is a side view illustrating the rotor 30B to which the cover tube 33 is attached. FIGS. 8 and 9 illustrate a state before the rotor 30 is fitted to the rotating shaft 35 (see FIG. 1). In the following description and drawings, portions that perform the same functions as those of the first embodiment will be denoted by the same reference numerals, and redundant description will be omitted appropriately.

In the rotor 30B of the fourth embodiment, as illustrated in FIG. 8, the permanent magnet 32 on each row is divided into three parts along the rotational axis direction X of the sleeve 31. The permanent magnet 32 on each row is arranged along the arrangement direction S1 with respect to the rotational axis direction X of the sleeve 31. In each row, the permanent magnets 32 adjacent to the arrangement direction S1 are disposed to be skewed in parallel to the direction S2 approximately orthogonal to the rotational axis direction X. In the present embodiment, the permanent magnets 32 adjacent to the arrangement direction S1 are arranged so that the long sides thereof are continuous to each other. That is, the permanent magnets 32 are arranged along the arrangement direction S1 in the rotational axis direction X of the sleeve 31 and are arranged in parallel along the direction S2 approximately orthogonal to the rotational axis direction X so that the long sides thereof are continuous to each other in the circumferential direction.

In the rotor 30B of the fourth embodiment, as illustrated in FIG. 9, the cover tube 33 is divided into three parts along the rotational axis direction X similarly to the first embodiment. Since the configuration of the cover tube portions 33a to 33c serving as the cover tube 33 is the same as that of the first embodiment, the description thereof will be omitted.

In the rotor 30B of the fourth embodiment, when the permanent magnets 32 on each row are arranged in a skewed manner as illustrated in FIG. 8, the position of one or a plurality of permanent magnets 32 may be skewed in the circumferential direction. In this case, in the rotor 30B, since one or a plurality of corner portions 321 (see FIG. 6) protrude in the arrangement direction S1, when the cover tube portion is inserted into the rotor 30B, the inner circumferential surface of the cover tube portion is scraped by the protruding corner portions 321. However, as illustrated in FIG. 9, when the cover tube 33 is divided into three parts, since the length of the inner circumferential surface of the cover tube portion scraped by the corner portion 321 of the permanent magnet 32 can be reduced, it is possible to suppress a decrease in strength of the cover tube 33.

Fifth Embodiment

Figure 10:
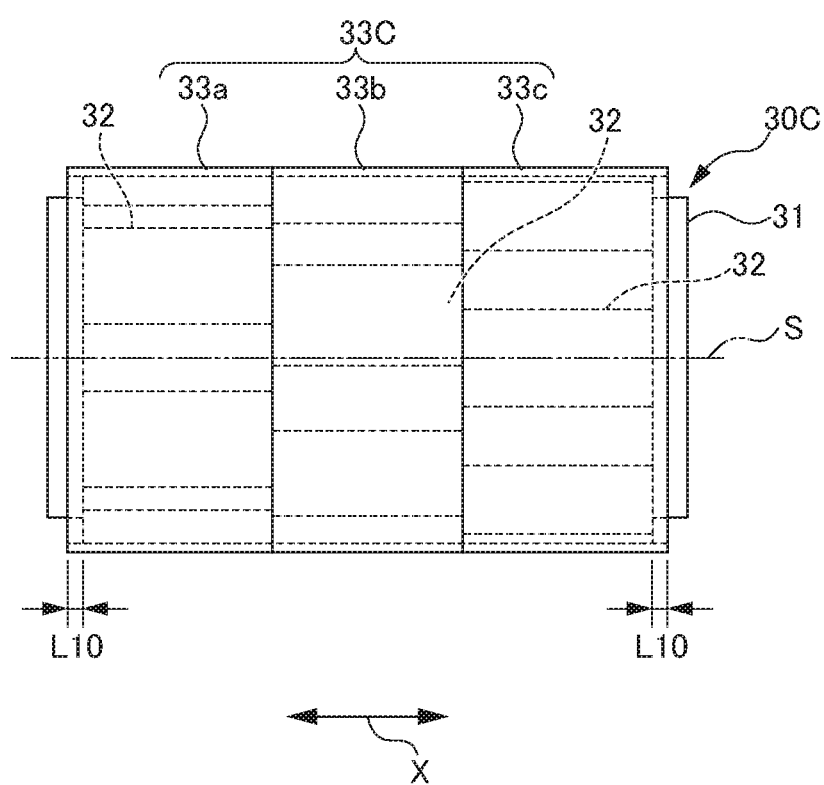
FIG. 10 is a cross-sectional view illustrating a configuration of a cover tube 33B according to the fourth embodiment.

FIG. 10 is a cross-sectional view illustrating a configuration of a cover tube 33C according to the fifth embodiment. FIG. 10 illustrates a cross-section along the rotational axial line S of the rotor 30C. In the description and drawing of the fifth embodiment, members equivalent to those of the first embodiment will be denoted by the same reference numerals as those of the first embodiment, and redundant description thereof will be omitted appropriately.

As illustrated in FIG. 10, in the rotor 30C of the fifth embodiment, the permanent magnet 32 is divided into three parts along the rotational axis direction X. Moreover, the cover tube 33C is divided into three parts along the rotational axis direction X of the rotor 30. In the rotor 30C of the fifth embodiment, the number of divisions of the permanent magnet 32 and the cover tube 33 is the same as that of the first embodiment.

In the rotor 30C of the fifth embodiment, the ends of the cover tube portions 33a and 33c disposed at both ends of the rotational axis direction X protrude outward further than the permanent magnet 32. In the rotational axis direction X, the length L10 of the ends of the cover tube portions 33a and 33c protruding outward further than the permanent magnet 32 is preferably set to approximately 1 to 10 mm, for example, regardless of the size of the rotor 30C. When the length L10 is too large, since the ends of the cover tube portions 33a and 33c are likely to vibrate with wind pressure, ablation of the CFRP that forms the cover tube portion may progress.

According to the rotor 30C of the fifth embodiment, since the ends of the cover tube portions 33a and 33c protrude outward further than the permanent magnet 32, even when the end surface on the outer side of the permanent magnet 32 disposed at both ends in the rotational axis direction X are warped, it is possible to allow the permanent magnet 32 to make close contact with the sleeve 31 more reliably. By doing so, since a contact area between the permanent magnet 32 and the sleeve 31 can be secure, it is possible to increase the frictional force between them. Therefore, according to the configuration of the fifth embodiment, it is possible to suppress the permanent magnet 32 from being skewed in the circumferential direction due to the inertia more effectively during rotor 30C is rotating. Moreover, according to the configuration of the fifth embodiment, since the permanent magnet 32 is not exposed to the outer side of the rotor 30C, it is possible to suppress the permanent magnet 32 from being detached to the outer side in the radial direction by the centrifugal force generated due to rotation of the rotor 30C.

As the configuration of the cover tube portion 33a to 33c, the configuration (see FIGS. 5A, 5B, and 5C) of the second embodiment can be applied to the rotor 30C of the fifth embodiment. Moreover, as the configuration of the permanent magnet 32, the configuration (see FIG. 6) of the third embodiment, for example, can be applied to the rotor 30C of the fifth embodiment.

Sixth Embodiment

Figure 11A:
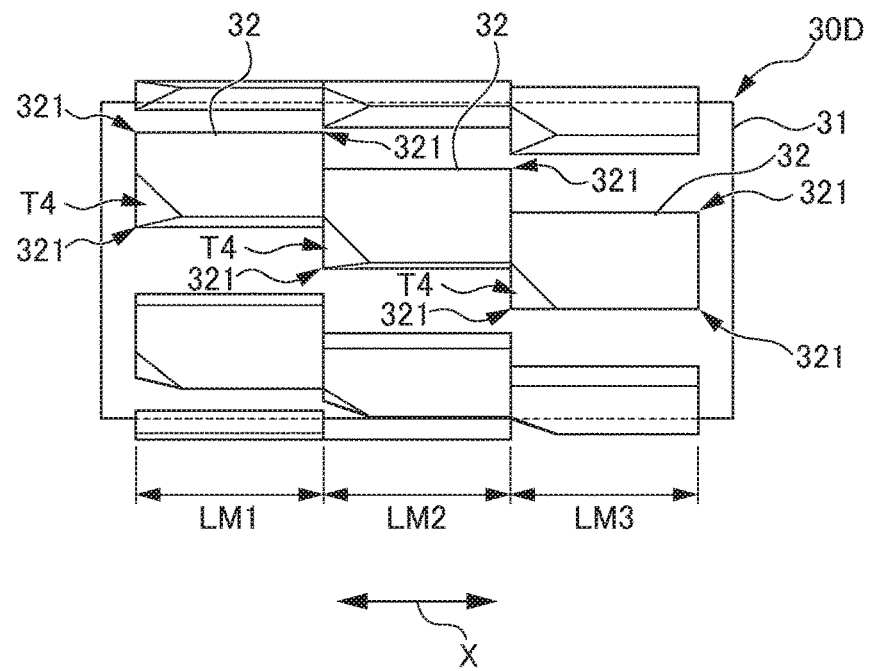
FIG. 11A is a side view illustrating a first configuration of a rotor 30D in which permanent magnets 32 according to a sixth embodiment are arranged.
Figure 11B:
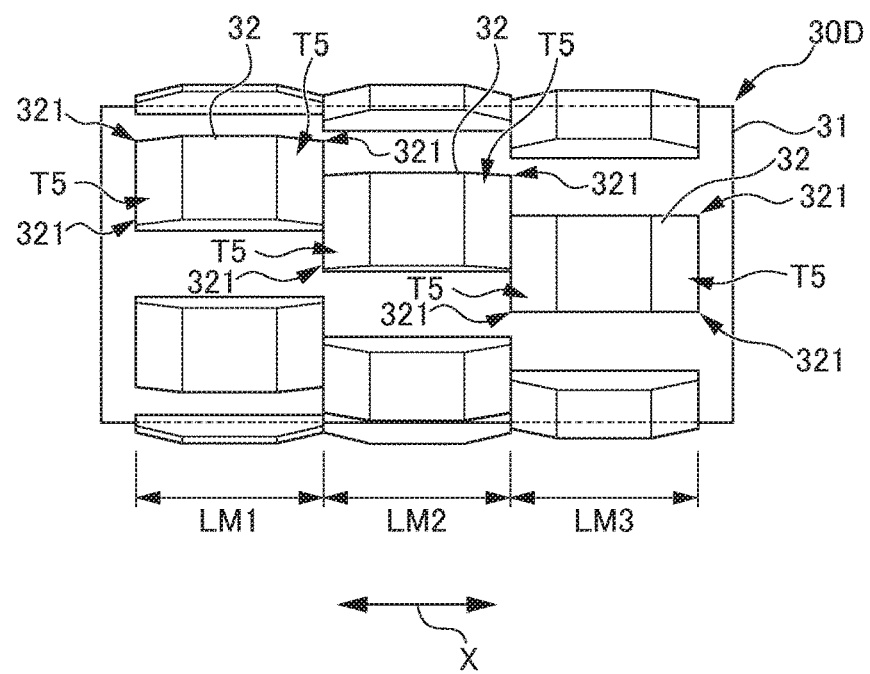
FIG. 11B is a side view illustrating a second configuration of the rotor 30D in which the permanent magnets 32 according to the sixth embodiment are arranged.

Next, a configuration of the cover tube 33 according to the sixth embodiment will be described. FIG. 11A is a side view illustrating a first configuration of a rotor 30D in which the permanent magnet 32 of the sixth embodiment is disposed. FIG. 11B is a side view illustrating a second configuration of the rotor 30D in which the permanent magnet 32 of the sixth embodiment is disposed. FIGS. 11A and 11B illustrate a state before the rotor 30D is fitted to the rotating shaft 35 (see FIG. 1). In the following description and drawings, portions that perform the same functions as those of the first embodiment will be denoted by the same reference numerals, and redundant description will be omitted appropriately. In FIGS. 11A and 11B, illustration of the rotational axial line S, the arrangement direction S1, and the like which are not necessary for description of the present embodiment are omitted. In the sixth embodiment, although the first embodiment (see FIG. 3) is described as the arrangement of the permanent magnets 32 by way of an example, the arrangement of the permanent magnets 32 may be the same as that of the third embodiment (see FIG. 6), for example.

As illustrated in FIG. 11A, in the rotor 30D of the first configuration of the sixth embodiment, the permanent magnet 32 includes a tapered portion T4 at one corner on the side serving as the advancing direction when attaching the cover tube portion (for example, the cover tube portions 33a to 33c illustrated in FIG. 1) to the outer circumference side of the permanent magnet 32. FIG. 11A illustrates an example in which the direction from the left side to the right side of the rotational axis direction X in the rotor 30D is the advancing direction of the cover tube portion. The tapered portion T4 has a shape that the corner portion 321 provide in that portion is linearly notched. In the rotor 30D, when the direction from the right side to the left side of the rotational axis direction X is the advancing direction of the cover tube portion, the tapered portion T4 is provided at a corner of the permanent magnet 32 on the opposite side (the opposite side on a diagonal line) from the position illustrated in FIG. 11A.

According to the first configuration of the sixth embodiment, when the cover tube portion (the cover tube 33) is inserted into the rotor 30D, since the tapered portion T4 of the permanent magnet 32 makes contact with the inner circumferential surface of the cover tube portion in an oblique direction, it is possible to suppress the inner circumferential surface of the cover tube portion from being scraped by the corner portion 321 of the permanent magnet 32. In the rotor 30D illustrated in FIG. 11A, the permanent magnet 32 may have the tapered portions T4 at the four corners thereof.

As illustrated in FIG. 11B, in the rotor 30D of the second configuration of the sixth embodiment, the permanent magnet 32 has tapered portions T5 at a side serving as the advancing direction when attaching the cover tube portion (for example, the cover tube portions 33a to 33c illustrated in FIG. 1) to the outer circumference side of the permanent magnet 32 and the opposite side thereof.

According to the second configuration of the sixth embodiment, when the cover tube portion (the cover tube 33) is inserted into the rotor 30D, since the tapered portion T5 of the permanent magnet 32 makes contact with the inner circumferential surface of the cover tube portion in an oblique direction, it is possible to suppress the inner circumferential surface of the cover tube portion from being scraped by the corner portion 321 of the permanent magnet 32.

According to the second configuration of the sixth embodiment, since the cover tube portion can be inserted into the rotor 30D in any direction of the rotational axis direction X, it is not necessary to take the direction of arranging the permanent magnet 32 in relation to the sleeve 31 into consideration. Therefore, according to the second configuration of the sixth embodiment, it is possible to improve the productivity of the rotor 30D. In the rotor 30D illustrated in FIG. 11B, the permanent magnet 32 may have the tapered portions T5 on four sides thereof.

While the embodiments of the present invention have been described, the present invention is not limited to the above-described embodiments. Various modifications and changes can occur like the modified embodiment to be described later, and these modifications and changes fall within the technical scope of the present invention. The advantageous effects described in the embodiments are only exemplary ones of most preferable effects produced by the present invention, and the advantageous effects of the present invention are not limited to those described in the above embodiments. The above-described embodiments and the modified embodiments to be described later can be used in appropriate combination, and the detailed description thereof will be omitted.

Modified Embodiment

Figure 12:
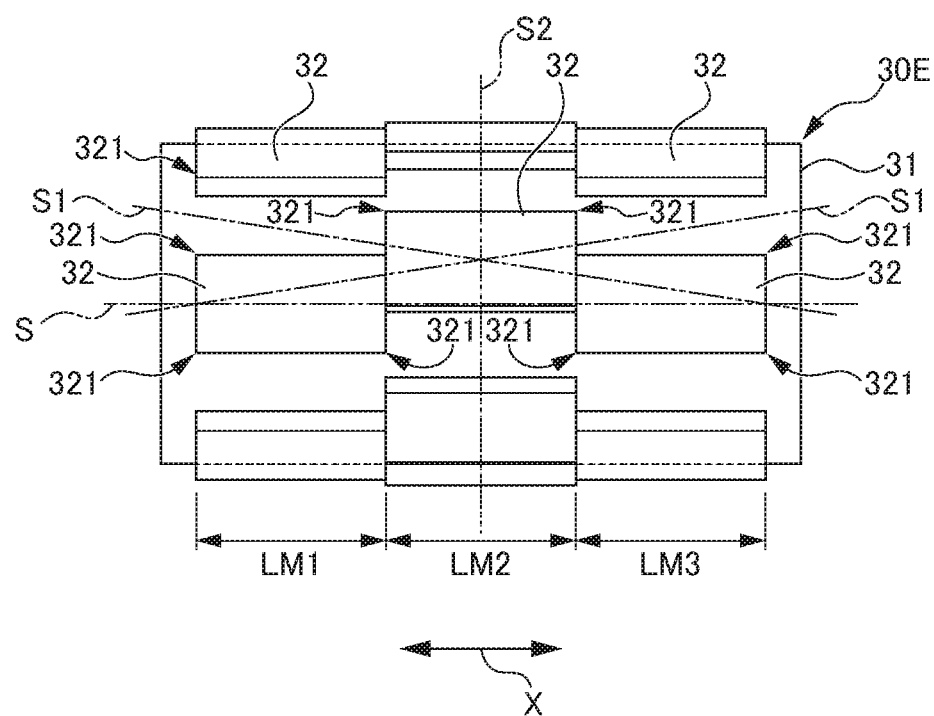
FIG. 12 is a side view illustrating a configuration of a rotor 30F in which permanent magnets 32 according to a modified embodiment are arranged.

FIG. 12 is a side view illustrating a configuration of a rotor 30E in which a permanent magnet 32 of a modified embodiment is disposed. FIG. 12 illustrates a state before the rotor 30E is fitted to the rotating shaft 35 (see FIG. 1). In the following description and drawings, portions that perform the same functions as those of the first embodiment will be denoted by the same reference numerals, and redundant description will be omitted appropriately.

In the rotor 30E of this modified embodiment, as illustrated in FIG. 12, the permanent magnet 32 on each row is divided into three parts along the rotational axis direction X of the sleeve 31. The permanent magnet 32 on each row is arranged along the arrangement direction S1 with respect to the rotational axis direction X of the sleeve 31. In each row, the permanent magnets 32 adjacent to the arrangement direction S1 are disposed to be skewed alternately in parallel to the direction S2 approximately orthogonal to the rotational axis direction X. In this manner, in this modified embodiment, the permanent magnets 32 are arranged along the arrangement direction S1 in the rotational axis direction X of the sleeve 31 and are arranged to be skewed alternately in parallel to the direction S2 approximately orthogonal to the arrangement direction S1 an the circumferential direction. Due to this, in this modified embodiment, the permanent magnets 32 are arranged in a partially skewed manner. Therefore, as illustrated in FIG. 12, the corner portions 321 of the permanent magnets 32 on each row protrude in a step form along the arrangement direction S1.

In this modified embodiment, the corner portions 321 of the permanent magnets 32 on each row arranged in a partially skewed manner protrude in a step form along the arrangement direction S1. However, as illustrated in FIG. 4 and the like, for example, since the cover tube 33 is divided into a plurality of parts, the length of the inner circumferential surface of the cover tube portion scraped by the corner portion 321 of the permanent magnet 32 can be reduced. Due to this, in the rotor 30E of this modified embodiment, a decrease in the strength of the cover tube 33 due to the corner portion 321 of the permanent magnet 32 can be also suppressed. Moreover, in the divided cover tube portion, since the frictional force generated between the inner circumferential surface and the outer circumferential surface of the rotor 30E is smaller than that when the long cover tube is inserted into the rotor 30E, it is possible to insert the cover tube portion into the rotor 30E with a smaller force. As the configuration of the cover tube portions 33a to 33c, the configuration (see FIGS. 5A, 5B, and 5C) of the second embodiment can be applied to the rotor 30E of this modified embodiment.

An example in which one cover tube portion covers the plurality of permanent magnets 32 positioned at the same position in the rotational axis direction X and arranged in the circumferential direction has been described in the embodiments, the present invention is not limited thereto. Two or three cover tube portions may cover the plurality of permanent magnets 32 positioned at the same position in the rotational axis direction X and arranged in the circumferential direction. Although an example in which the permanent magnet 32 on each row is divided into three parts along the rotational axis direction X has been described in the embodiments, the number of divisions is not limited thereto. The permanent magnet 32 may be divided into two parts along the rotational axis direction X of the rotor 30 and may be divided into 4 or five or more parts.

Although the sleeve 31 has been described as an example of the rotating member that forms the rotor 30 in the embodiments, the rotating member is not limited thereto. In a configuration in which the permanent magnet 32 is disposed on the outer circumference side of the rotating shaft 35 without the sleeve 31 disposed therebetween, the rotating member may be the rotating shaft 35. Although an example in which the cover tube 33 is formed of a carbon fiber-reinforced plastic (CFRP) has been described in the embodiments, the material is not limited thereto. The cover tube 33 may be formed of a fiber-reinforced plastic (FRP) exemplified earlier and may be formed of a composite member mainly composed of a fiber-reinforced plastic.

EXPLANATION OF REFERENCE NUMERALS

1: Motor
20: Stator
30, 30A, 30B, 30C, 30D, 30E: Rotor
31: Sleeve
32: Permanent magnet
33, 33B: Cover tube
33a, 33b, 33c: Cover tube portion
35: Rotating shaft
T1-T5: Tapered portion

What is claimed is:

1. A rotor comprising:
   a rotating member;
   a permanent magnet arranged in a plurality of rows along a circumferential direction of the rotating member and divided into a plurality of parts in a rotational axis direction of the rotating member; and
   a cover tube divided into a plurality of parts in the rotational axis direction of the rotating member and covering an outer circumferential surface of the permanent magnet, the cover tube being formed of a fiber-reinforced plastic, wherein
   the plurality of permanent magnets in each row are arranged in an oblique direction with respect to the rotational axis direction of the rotating member, and the permanent magnets adjacent to the arrangement direction are disposed to be skewed in the circumferential direction and the divided permanent magnets each include a tapered portion that makes contact with an inner circumferential surface of the cover tube portion in an oblique direction for all sides surrounding the outer circumferential surface covered by the tube, and at least one of the divided cover tubes covers an outer circumferential surface of one of the divided permanent magnets in the circumferential direction of the rotating member.

2. The rotor, according to claim 1, wherein the divided cover tube has a tapered portion at an end of an inner circumferential surface on a side serving as an advancing direction when attaching the cover tube to the outer circumference side of the permanent magnet.

3. The rotor according to claim 1, wherein the divided cover tube has a tapered portion between an end of an inner circumferential surface on a side serving as an advancing direction when attaching the cover tube to the outer circumference side of the permanent magnet and an end on the opposite side.

4. The rotor according to claim 1, wherein at least one end in the rotational axis direction of the cover tube protrudes outward further than one end in the rotational axis direction of the permanent magnet.

5. The rotor according to claim 1, wherein the permanent magnet has the tapered portion at a corner portion of the outer circumferential surface.

6. A rotating electrical machine comprising:
the rotor according to claim 1; and
a stator provided on the outer circumference side of the rotor.

* * * * *